United States Patent
Takahashi et al.

(10) Patent No.: US 9,802,637 B2
(45) Date of Patent: Oct. 31, 2017

(54) STEERING DEVICE

(71) Applicant: YAMADA MANUFACTURING CO., LTD., Kiryu-shi (JP)

(72) Inventors: Ryosuke Takahashi, Kiryu (JP); Katsutoshi Tsuji, Kiryu (JP)

(73) Assignee: YAMADA MANUFACTURING CO., LTD., Kiryu-Shi, Gunma (JP)

( * ) Notice: Subject to any disclaimer, the term of this patent is extended or adjusted under 35 U.S.C. 154(b) by 22 days.

(21) Appl. No.: 15/094,854

(22) Filed: Apr. 8, 2016

(65) Prior Publication Data

US 2016/0311459 A1    Oct. 27, 2016

(30) Foreign Application Priority Data

Apr. 27, 2015    (JP) .................... 2015-090885

(51) Int. Cl.
  B62D 1/185    (2006.01)
  B62D 1/189    (2006.01)

(52) U.S. Cl.
  CPC ............. B62D 1/185 (2013.01); B62D 1/189 (2013.01)

(58) Field of Classification Search
  CPC ........ B62D 1/185; B62D 1/184; B62D 1/187; B62D 1/189; B62D 1/18
  USPC ........................................... 74/493; 280/775
  See application file for complete search history.

(56) References Cited

U.S. PATENT DOCUMENTS

| | | | |
|---|---|---|---|
| 2011/0175335 A1* | 7/2011 | Takezawa .............. | B62D 1/185 280/775 |
| 2012/0080874 A1* | 4/2012 | Narita .................... | B62D 1/184 280/777 |
| 2016/0167695 A1* | 6/2016 | Hagiwara .............. | B62D 1/184 74/493 |
| 2016/0280159 A1* | 9/2016 | Kakita ................... | B60R 16/027 |
| 2017/0101125 A1* | 4/2017 | Martinez ............... | B62D 1/192 |

FOREIGN PATENT DOCUMENTS

| JP | 2008-100597 A | 5/2008 |
|---|---|---|
| JP | 2009-029224 A | 2/2009 |

\* cited by examiner

*Primary Examiner* — Keith J Frisby
(74) *Attorney, Agent, or Firm* — McGinn IP Law Group, PLLC

(57) ABSTRACT

Provided is a steering device including an inner pipe, an outer column including a holding main body section and a clamp section, a fixed bracket including fixed side sections, a stopper bracket including a movable guide section firmly attached to the inner pipe, and attachment sections formed at front-back-direction both ends of the movable guide section, and a hanger bracket in which sections to be attached to both the attachment sections are formed on front-back-direction both sides, the hanger bracket including side plate sections which sandwich width-direction both side surfaces of the clamp section and in which long holes for telescopic adjustment are formed. The attachment sections of the stopper bracket and the sections to be attached of the hanger bracket are firmly attached and joined by joining members.

4 Claims, 6 Drawing Sheets

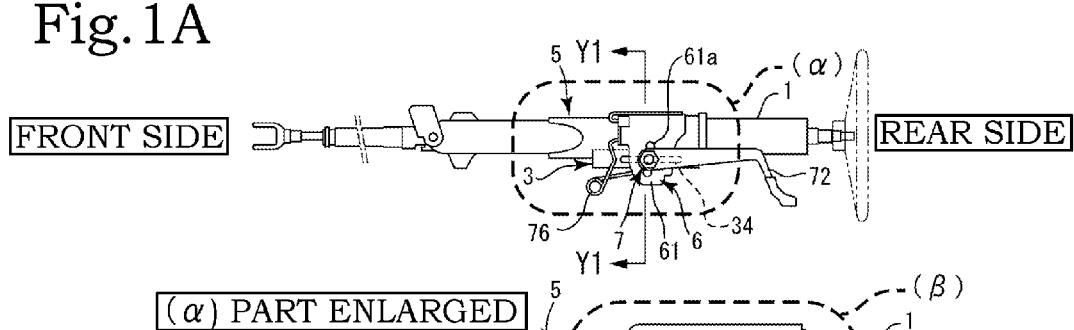
Fig.1A
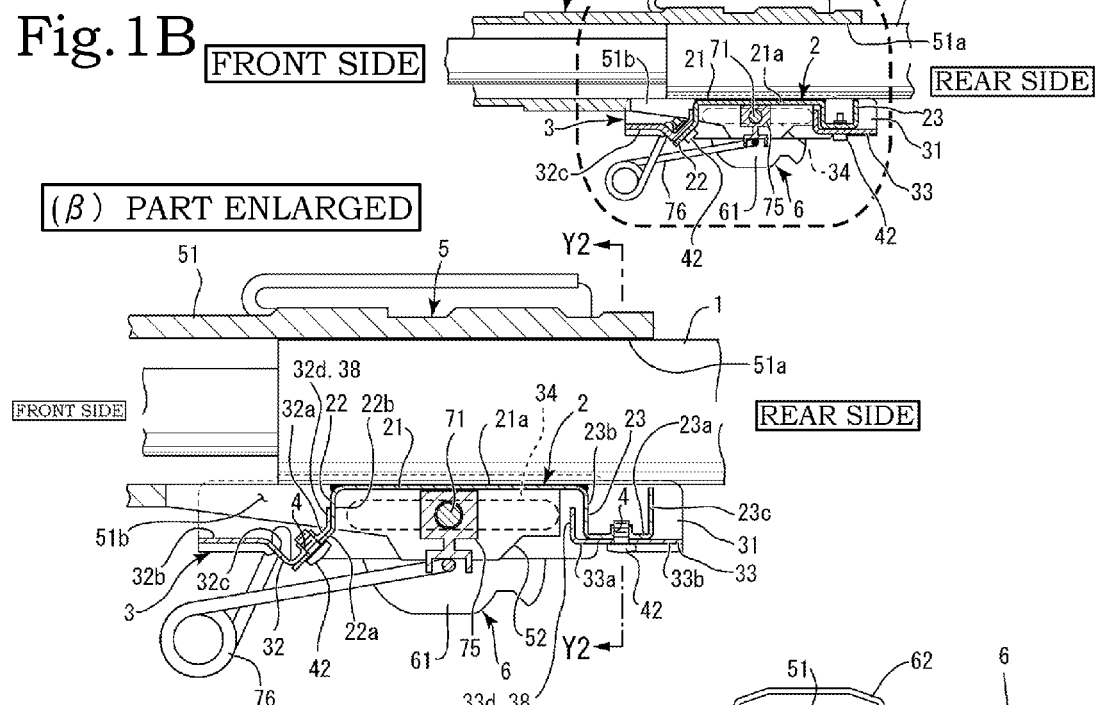
Fig.1B
Fig.1C
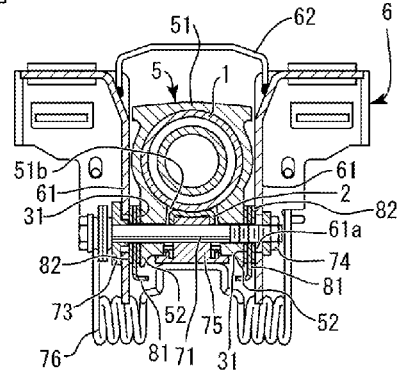
Fig.1D

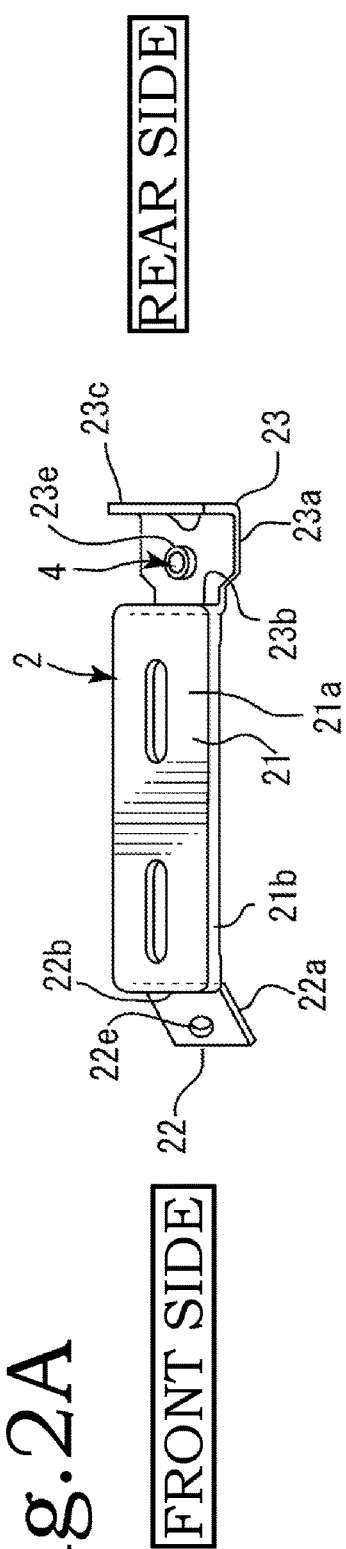
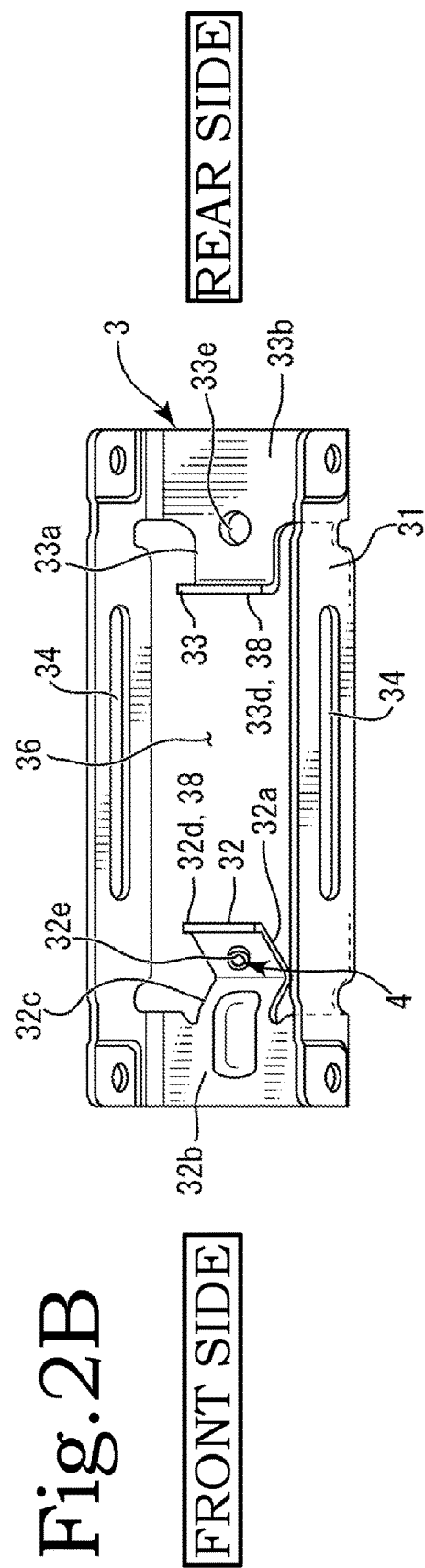
Fig.2A
Fig.2B

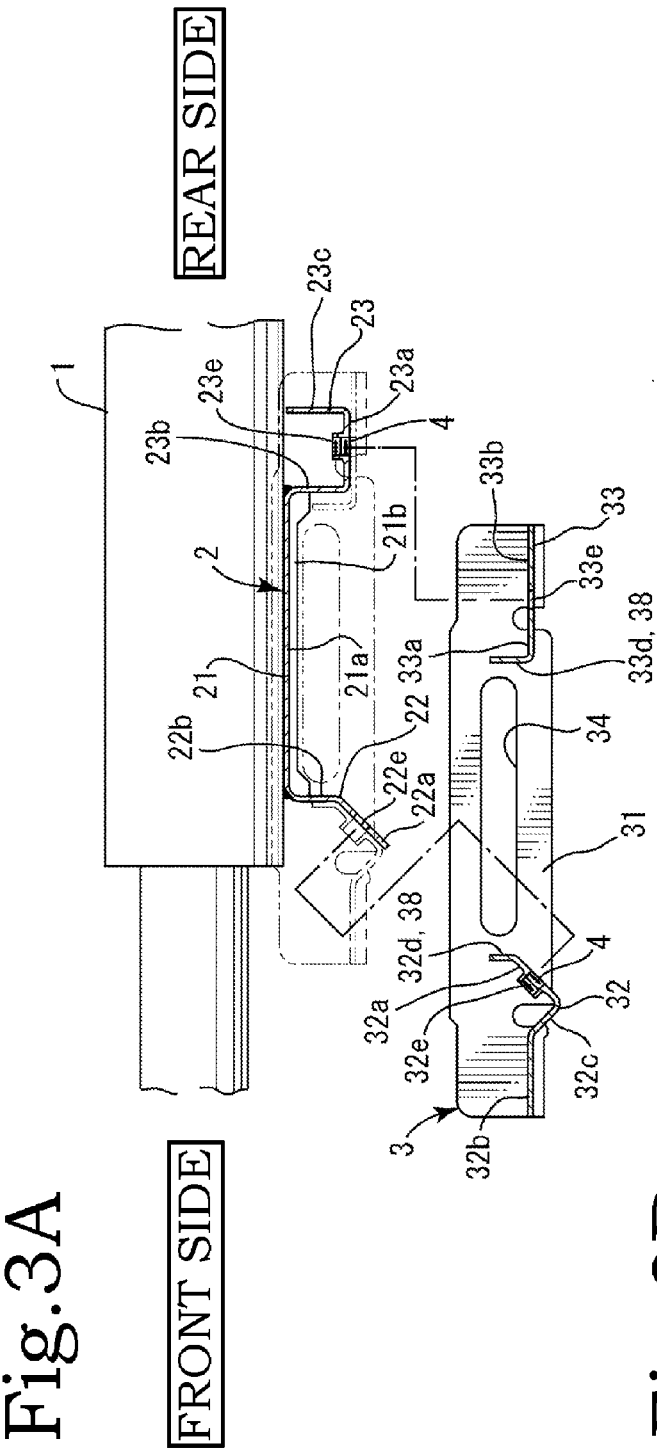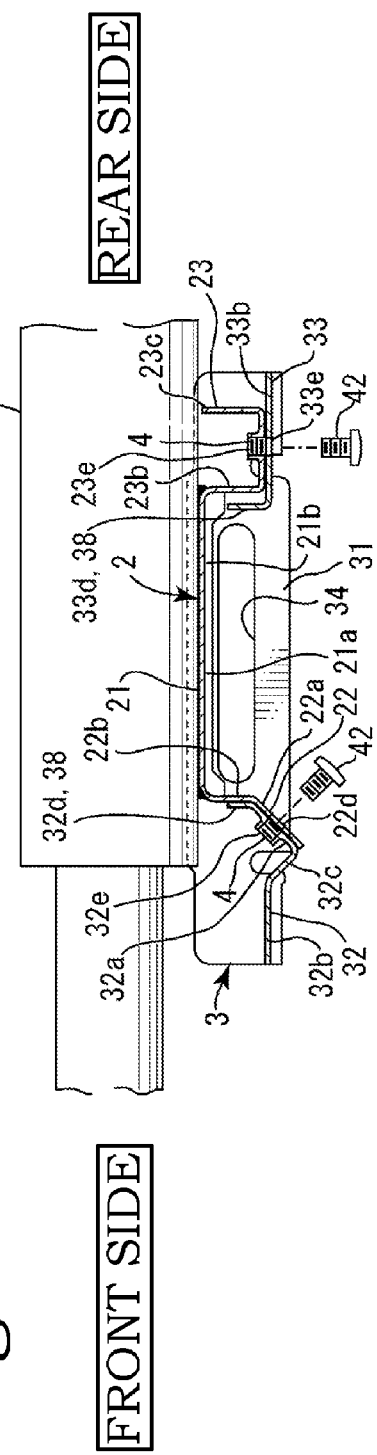
Fig.3A
Fig.3B

Y2-Y2 ARROW VIEW

STEERING DEVICE

BACKGROUND OF THE INVENTION

1. Field of the Invention

The present invention relates to a steering device including a telescopic adjustment mechanism, the steering device having satisfactory telescopic operability by reducing a harmful effect of shape deformation in weldbonding and improving assembly accuracy.

2. Description of the Related Art

In general, in a steering device including a tilting/telescopic mechanism, a part where components are bonded by welding is present in the structure thereof. For example, in Japanese Patent Application Laid-Open No. 2009-029224, a distance bracket, in which a long hole for telescoping is formed, and an upper jacket are welded. Further, in Japanese Patent Application Laid-Open No. 2008-100597, a bonding support bracket mounted with a second friction plate, in which a telescopic long hole is formed, is welded to an inner column.

Specifically, Japanese Patent Application Laid-Open Nos. 2009-029224 and 2008-100597 are generally explained with parentheses added to the reference numerals and signs used in the respective patent literatures. In Japanese Patent Application Laid-Open No. 2009-029224, a substantially U-shaped distance bracket (4), in which a long hole for telescoping (4d) is formed, is integrally bonded to the lower surface of the lower end portion of an upper jacket (1b) by weldbonding. A pair of side brackets (3c, 3c) is provided to sandwich the distance bracket (4).

In the outward direction of the side bracket (3c), three tilt friction plates (5) and three telescopic friction plates (6) are stacked and disposed to be alternately superimposed in the up-down direction and the vehicle body front-back direction, which are crossing directions. The lower part of the tilt friction plate (6) is inserted over a support pin (3e) formed in the side bracket (3c). On the other hand, the vehicle body front part of the telescopic friction plate (6) is inserted over a support pin (4e) formed in the distance bracket (4).

In Japanese Patent Application Laid-Open No. 2008-100597, a bonding support bracket (48) is welded and fixed to the intermediate part lower surface of an inner column (6a). A pair of bent plate sections (49, 49) bent at a right angle toward the front is formed at the lower half part left and right both end portions of the bonding support bracket (48). A support plate section (50) bent toward the front is formed at the lower end edge of the bonding support bracket (48).

When the lower end portions of second friction plates (40a, 40b) are supported on the intermediate part lower surface of the inner column (6a), in a state in which coupling sections (46a, 46b) that couple the rear end edges of the second friction plates (40a, 40b) are laid one on top of the other, the lower end edges of the coupling sections (46a, 46b) are placed on the upper surface of the support plate section (50). In this state, a holding bracket (51) is pushed into the rear end portion inner sides of the second friction plates (40a, 40b). The holding bracket (51) is fixed to the bonding support bracket (48) by holding screws (52, 52) inserted through both the bent plate sections (49, 49).

In Japanese Patent Application Laid-Open No. 2009-029224, the distance bracket (4) is firmly attached to the upper jacket (1b) by welding. Therefore, it is likely that distortion or deformation occurs in the distance bracket (4) because of thermal effect during welding work. When distortion occurs, parallelism of the long hole for telescoping (4d) is not maintained. Feeling during telescopic adjustment is deteriorated. Further, assemblability of components is deteriorated.

In Japanese Patent Application Laid-Open No. 2008-100597, the bonding support bracket (48) is welded and fixed to the intermediate part lower surface of the inner column (6a). Therefore, as in Japanese Patent Application Laid-Open No. 2009-029224, it is likely that distortion or deformation occurs because of thermal effect during welding work. When distortion occurs, parallelism of the bent plate section (49) is not maintained. Assembly accuracy of the second friction plates (40a, 40b) bonded to the bent plate section (49) is deteriorated.

In the second friction plates (40a, 40b), second long holes (28, 28), which are long holes for telescoping, are formed. Therefore, it is likely that feeling during telescopic adjustment is deteriorated. The bonding support bracket (48) is a bracket for fixing the second friction plates (40a, 40b) and is a dedicated component not particularly including other functions. Therefore, the number of components increases.

SUMMARY OF THE INVENTION

Therefore, it is an object of the present invention to provide a steering device that has satisfactory telescopic operability by reducing a harmful effect of shape deformation in weldbonding and improving assembly accuracy.

Therefore, the inventor earnestly repeated studies in order to solve the problems. As a result, according to a first aspect of the invention, there is provided a steering device including: an inner pipe; an outer column including a holding main body section in which the inner pipe is able to move in a front-back direction and to be fixed, and a clamp section that expands and reduces the holding main body section in a diameter direction; a fixed bracket including fixed side sections that sandwich width-direction both sides of the outer column; a stopper bracket including a movable guide section firmly attached to the inner pipe, and attachment sections formed at front-back-direction both ends of the movable guide section; and a hanger bracket in which sections to be attached to both the attachment sections are formed on front-back-direction both sides, the hanger bracket including side plate sections which sandwich width-direction both side surfaces of the clamp section and in which long holes for telescopic adjustment are formed. The attachment sections of the stopper bracket and the sections to be attached of the hanger bracket are firmly attached and joined by joining members.

According to a second aspect of the present invention, in the steering device in the first aspect, a stopper section that regulates a movement amount in the front-back direction during telescopic adjustment is formed in at least one side of the hanger bracket.

According to a third aspect of the present invention, in the steering device in the first or second aspect, friction plates for telescoping are fixed to outer side surfaces of the side plate sections of the hanger bracket, and friction plates for tilting are disposed between the outer side surfaces and the friction plates for telescoping.

In the present invention, the stopper bracket and the hanger bracket are connected via the joining members. The side plate sections are formed in the hanger bracket. Both the side plate sections come into contact with the width-direction both surfaces of the clamp section and the inner surfaces of both the fixed side sections of the fixed bracket.

In the present invention, the hanger bracket is mounted on the stopper bracket, which is firmly attached to the inner pipe by welding, by the joining members such as pins or screws rather than welding. Since the hanger bracket is not firmly attached by welding, distortion and deformation due to thermal effect do not occur. It is possible to maintain parallelism of both the side plate sections in which the long holes for telescopic adjustment are formed. Consequently, it is possible to perform satisfactory telescopic operation. Assemblability is improved. Further, it is possible to fix a lever load during lever fastening.

By mounting the hanger bracket with the joining members such as pins or screws, during assembly of the hanger bracket, it is possible to mount the hanger bracket in a position where dimension fluctuation of peripheral components is absorbed. Consequently, even when distortion or deformation due to thermal effect occurs in the stopper bracket and when there is a dimension error of the peripheral components, it is possible to mount the hanger bracket in an appropriate position. It is possible to maintain satisfactory tilting/telescopic operability. Further, it is possible to prevent the rotation of the inner pipe with the hanger bracket.

BRIEF DESCRIPTION OF THE DRAWINGS

FIG. 1A is a side view of a steering device in a first embodiment of the present invention, FIG. 1B is a partially enlarged sectional view of an (α) part of FIG. 1A, FIG. 1C is an enlarged view of a (β) part of FIG. 1B, and FIG. 1D is an Y1-Y1 arrow enlarged view of FIG. 1A;

FIG. 2A is a plan perspective view of a stopper bracket, and FIG. 2B is a plan perspective view of a hanger bracket;

FIGS. 3A and 3B are partial sectional main part side views showing a process for attaching and connecting the hanger bracket to the stopper bracket;

DESCRIPTION OF THE PREFERRED EMBODIMENTS

Figure 4A:
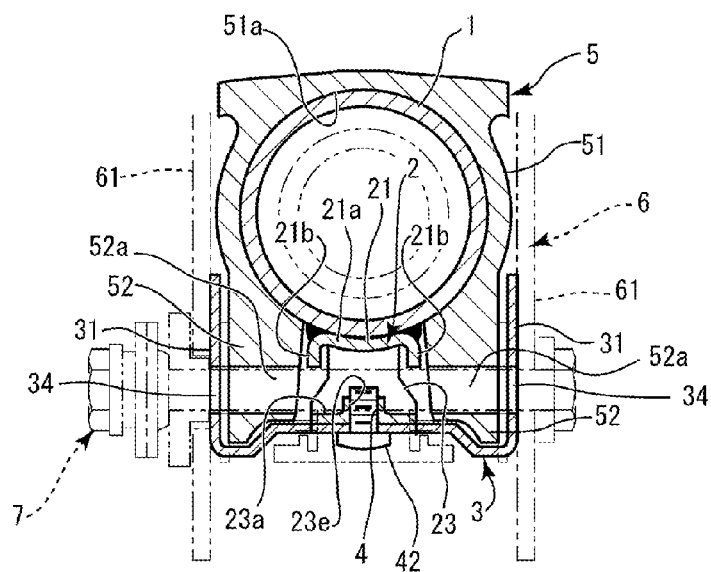
FIG. 4A is a partially omitted Y2-Y2 arrow enlarged sectional view of FIG. 1C.

Embodiments of the present invention are explained below with reference to the drawings. As terms indicating directions in the explanation, there are a front side and a rear side. The front side and the rear side are based on the front-back direction of an automobile in a state in which a steering device in the present invention is mounted on the automobile. Specifically, in constituent members of the steering device, a front wheel side of the automobile is set as the front side and a steering wheel side is set as the rear side. The axial direction of shafts configuring the steering device is the same as the front-back direction. The front side and the rear side are described in main drawings.

The steering device in the present invention includes a tilting/telescopic mechanism. The main configuration of the steering device includes, as shown in FIGS. 1A to 1D, an inner pipe 1, a stopper bracket 2, a hanger bracket 3, screw sections 4, an outer column 5, a fixed bracket 6, and a fastener 7.

In the inner pipe 1, an upper shaft A configuring the steering device is mounted on the inside of the inner pipe 1 to be rotatable in the circumferential direction. A steering wheel is mounted on the distal end of the upper shaft A projecting from the axial-direction (front-back-direction) rear end side of the inner pipe 1 (see FIG. 1A). The stopper bracket 2 is firmly attached by welding in a predetermined position in the axial direction of the inner pipe 1 and on the lower end face in the diameter direction of the inner pipe 1 (see FIGS. 1B to 1D).

The predetermined position of the inner pipe 1 refers to the lower end face within a range supported by the outer column 5 and the fixed bracket 6 explained below in a state in which the inner pipe 1 is properly mounted on a vehicle body by the outer column 5 and the fixed bracket 6 (see FIGS. 1B to 1D).

The stopper bracket 2 is configured from a movable guide section 21 and an attachment section 22 on the front side and an attachment section 23 on the rear side (see FIGS. 1C, 2A, 3A and 3B, etc.). The stopper bracket 2 plays a role of a member for mounting the hanger bracket 3 on the inner pipe 1 and a role of regulating a movement amount of the inner pipe 1 during telescopic adjustment.

The movable guide section 21 is a portion firmly attached to the lower end face of the inner pipe 1 by welding. The movable guide section 21 is configured from a guide main plate 21a formed in a substantially rectangular shape having a longitudinal direction in the front-back direction and both suspended side plates 21b formed below the width-direction both ends of the guide main plate 21a.

Both the suspended side plates 21b play a role of reinforcing the stopper bracket 2 and play a role of a guide during relative movement of a cushioning member 75 mounted on a bolt shaft 71 of the fastener 7. A spring 76 is mounted on the fixed bracket 6. The spring 76 elastically urges the cushioning member 75 to the movable guide section 21 of the stopper bracket 2 (see FIG. 1C).

The attachment section 22 on the front side and the attachment section 23 on the rear side are formed at both the ends in the front-back direction of the movable guide section 21. The attachment section 22 on the front side is located on the front side of the movable guide section 21. The attachment section 23 on the rear side is located on the rear side of the movable guide section 21. The movable guide section 21 and the attachment sections 22 and 23 on the front side and the rear side configuring the stopper bracket 2 are integrally molded from a metal material by a method such as pressing.

The attachment section 22 on the front side and the attachment section 23 on the rear side have different shapes. In the attachment section 22 on the front side, a suspended front plate 22b is formed downward from the front end of the movable guide section 21 and an attachment front plate 22a inclining from the lower end of the suspended front plate 22b toward the front side of the movable guide section 21 is formed (see FIGS. 1C, 2A, 3A and 3B, etc.).

In the attachment section 23 on the rear side, a suspended rear plate 23b is formed downward from the rear end of the movable guide section 21, a horizontal attachment rear plate 23a is formed further toward the rear side than the rear end of the movable guide section 21 from the lower end of the suspended rear plate 23b, and a vertical plate 23c is formed upward from the rear end of the attachment rear plate 23a.

Through-holes for attachment 22e and 23e are respectively formed in the attachment front plate 22a and the attachment rear plate 23a.

The screw section 4 is provided in the through-hole for attachment 23e of the attachment rear plate 23a (see FIGS. 1C, 2A, 3A and 3B, etc.). At least one of the suspended front plate 22b and the suspended rear plate 23b play a role of a stopper for regulating movement of the inner pipe 1 during the telescopic adjustment.

The hanger bracket 3 is attached to the stopper bracket 2 via pins, screws, or the like functioning as joining members 42 (see FIGS. 1C, 2A, 3A and 3B, etc.). In the hanger bracket 3, side plate sections 31 are formed on the width-direction both sides. Both the side plate sections 31 are formed in a vertical surface shape, formed in a substantially rectangular shape in the longitudinal direction along the front-back direction, and opposed to each other in a parallel state. In both the side plate sections 31, long holes for telescopic adjustment 34 formed as elliptical through-holes along the longitudinal direction thereof are formed.

In the hanger bracket 3, sections to be attached 32 and 33 on the front side and the rear side that couple both the side plate sections 31 at lower ends and in front-back-direction both end parts are formed. The section to be attached 32 on the front side is located on the front side of the hanger bracket 3. The section to be attached 33 on the rear side is located on the rear side of the hanger bracket 3. Both the sections to be attached 32 and 33 on the front side and the rear side play a role of coupling both the side plate sections 31 and a role of attaching and connecting the hanger bracket 3 to the stopper bracket 2. The hanger bracket 3 is integrally molded from a metal plate such as an iron plate by press molding. The section to be attached 32 on the front side and the section to be attached 33 on the rear side have different shapes and are formed to match the shapes of the attachment section 22 on the front side and the attachment section 23 on the rear side of the stopper bracket 2.

In the section to be attached 32 on the front side, a projecting plate 32c inclining downward toward the rear side (the inner center side of the hanger bracket 3) from a substantially rectangular coupling front plate 32b, which couples both the side plate sections 31, is formed. A front plate to be attached 32a inclining upward from the lower end of the projecting plate 32c is formed. An upward front end plate 32d is formed from the upper end of the front plate to be attached 32a (see FIGS. 1C, 2A, 3A and 3B, etc.).

In the section to be attached 33 on the rear side, a rear plate to be attached 33a projecting horizontally toward the front side (the inner center side of the hanger bracket 3) from a substantially rectangular coupling rear plate 33b, which couples both the side plate sections 31, is formed. An upward rear end plate 33d is formed from the inner end of the rear plate to be attached 33a.

In the hanger bracket 3, a substantially rectangular gap section 36 is provided between the section to be attached 32 on the front side and the section to be attached 33 on the rear side. Through-holes for attachment 32e and 33e are formed in the front plate to be attached 32a and the rear plate to be attached 33a. The screw section 4 is provided in the through-hole for attachment 32e of the front plate to be attached 32a.

At the axial-direction both ends of the hanger bracket 3, at least one of the front end plate 32d of the section to be attached 32 and the rear end plate 33d of the section to be attached 33 is used as a stopper section 38 that plays a role of a stopper for regulating movement of the inner pipe 1 during the telescopic adjustment (see FIGS. 1B, 1C, 3B, 6, etc.). During the telescopic adjustment, the bolt shaft 71 or the cushioning member 75 of the fastener 7 comes into contact with the front end plate 32d and the rear end plate 33d used as the stopper section 38. Consequently, movement of the inner pipe 1 with respect to the fixed bracket 6 in the telescopic adjustment is regulated.

The screw sections 4 are formed in the through-hole for attachment 23e of the stopper bracket 2 and the through-hole for attachment 32e of the hanger bracket 3 (see FIGS. 2A and 2B, 3A and 3B, etc.). When joining members such pins or screws are inserted through the screw sections 4, the screw sections 4 play a role of connecting the attachment sections 22 and 23 on the front side and the rear side of the stopper bracket 2 and the sections to be attached 32 and 33 of the hanger bracket 3 each other.

When the hanger bracket 3 is attached to the stopper bracket 2, the hanger bracket 3 and the stopper bracket 2 are assembled such that the front plate to be attached 32a including the screw section 4 is located above the attachment front plate 22a and the attachment rear plate 23a including the screw section 4 is located above the rear plate to be attached 33a. The joining members 42 such as pins or screws are fastened from below the attachment front plate 22a and the rear plate to be attached 33a.

The hanger bracket 3 is connected to, via the screw sections 4, the stopper bracket 2 firmly attached to the inner pipe 1 by welding, whereby a movable bracket including the long holes for telescopic adjustment 34 is included in the inner pipe 1. The attachment section 22 on the front side and the section to be attached 32 on the front side and the attachment section 23 on the rear side and the section to be attached 33 on the rear side of the stopper bracket 2 and the hanger bracket 3 play a role of regulating a movement amount in the front-back direction of the inner pipe 1 when the bolt shaft 71 of the fastener 7 or the cushioning member mounted on the bolt shaft 71 comes into contact with the attachment section 22 on the front side and the section to be attached 32 on the front side and the attachment section 23 on the rear side and the section to be attached 33 on the rear side during the telescopic adjustment.

In a second embodiment of the present invention, the attachment front plate 22a and the attachment rear plate 23a of the stopper bracket 2 are respectively formed in horizontal surface shape. Similarly, the front plate to be attached 32a and the rear plate to be attached 33a of the hanger bracket 3 are respectively formed in horizontal surface shapes (see FIG. 6).

Figure 4B:
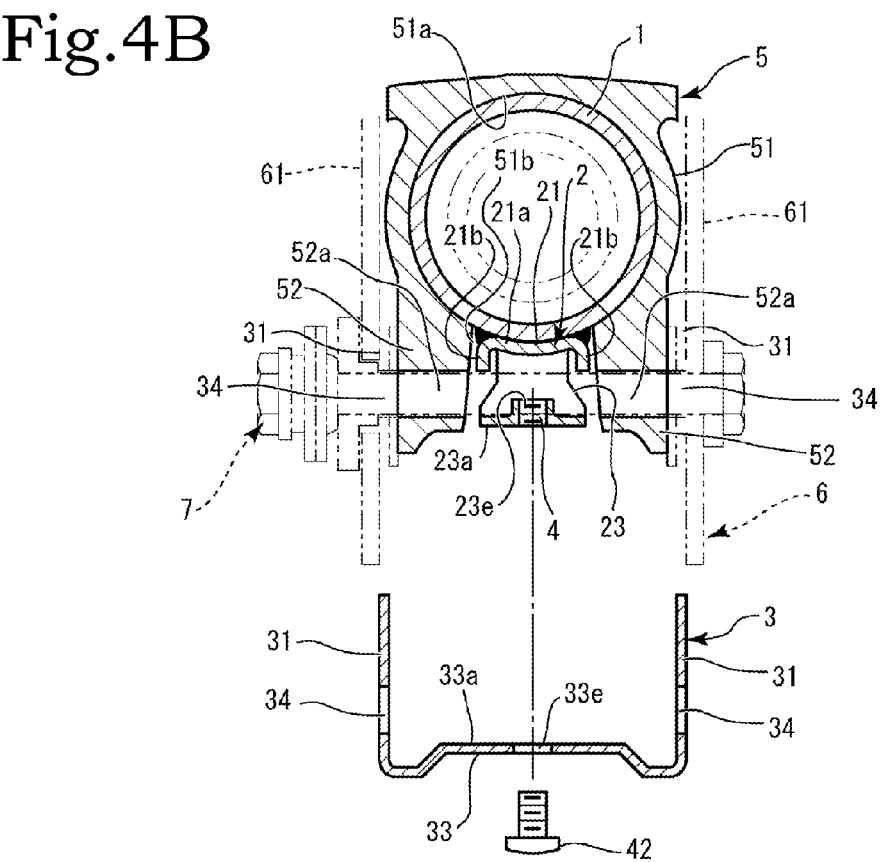
FIG. 4B is a view showing a state in which the hanger bracket is separated from the stopper bracket firmly attached to an outer column in FIG. 4A.
Figure 5A:
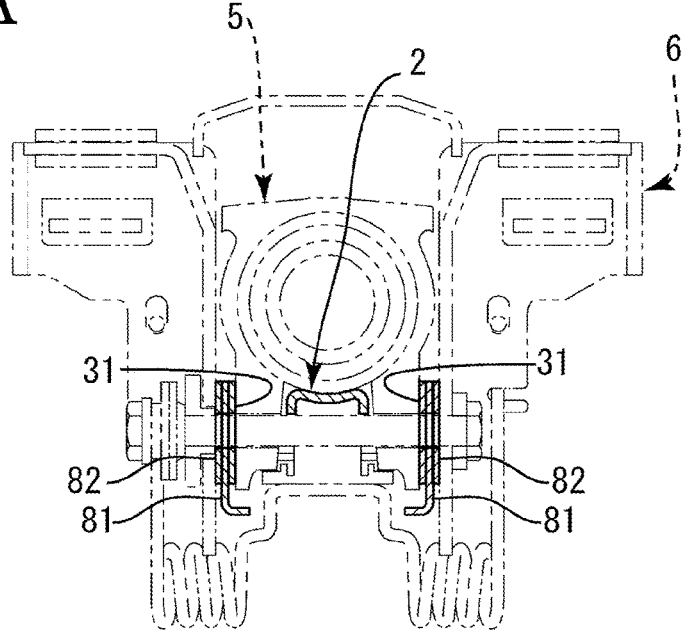
FIG. 5A is a partially omitted rear side sectional view of a state in which friction plates for tilting are mounted on both side plate sections of the hanger bracket.
Figure 5B:
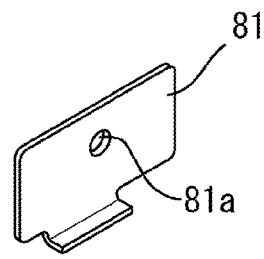
FIG. 5B is a perspective view of the friction plate for tilting.
Figure 5C:
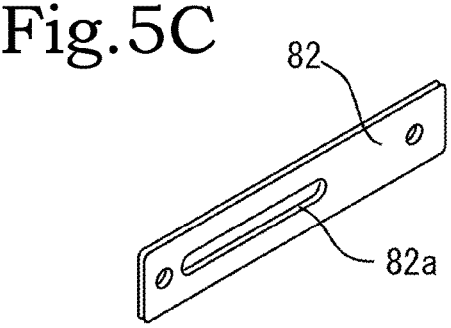
FIG. 5C is a perspective view of a friction plate for telescoping.
Figure 6:
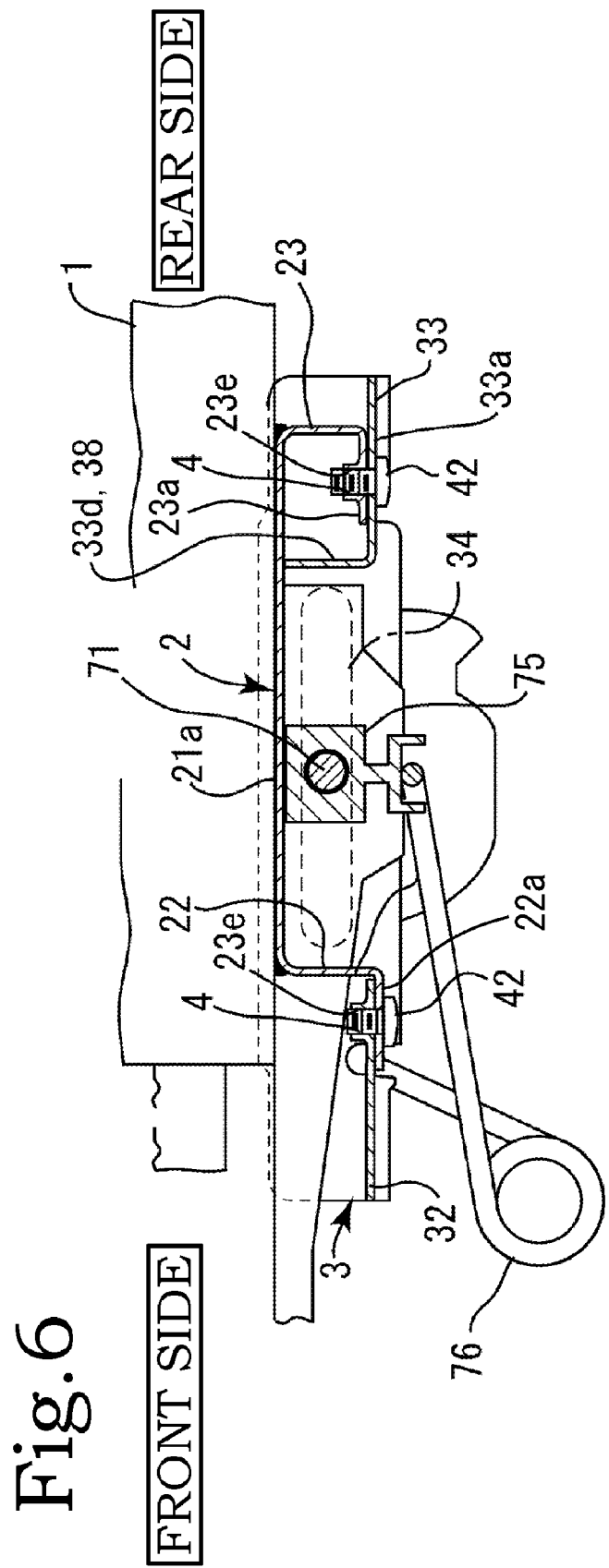
FIG. 6 is a partial sectional cutout main part side view of a steering device in a second embodiment of the present invention.

The outer column 5 is made of aluminum die cast and is configured from a holding main body section 51 and clamp sections 52 that are symmetrical and opposed to each other (see FIGS. 4A and 4B). The holding main body section 51 is formed in a substantially cylindrical shape hollowed on the inside. Specifically, the inside of the holding main body section 51 includes a holding inner circumferential section 51a formed in a hollow shape. A slit section 51b is formed on the diameter direction lower side of the holding main body section 51.

The slit section 51b is a separated portion discontinuous in the width direction along the front side to the rear side in the axial direction of the holding main body section 51. Edge portions opposed to each other on the width-direction both end sides of the slit section 51b approach each other, whereby the diameter of the holding inner circumferential section 51a decreases. The inner pipe 1 housed and mounted in the holding main body section 51 can be fastened and locked (fixed).

The clamp sections 52 are integrally formed from a lower part of the holding main body section 51 and the vicinities of the width-direction both ends of the slit section 51*b*. Both the clamp sections 52 have a symmetrical shape. Fastening holes 52*a*, through which the bolt shaft 71 of the fastener 7 is inserted, are respectively formed in the clamp sections 52. Both the clamp sections 52 are formed integrally with the holding main body section 51 in positions at the width-direction both side ends of the slit section 51*b*.

The fixed bracket 6 is configured from fixed side sections 61 formed on the width-direction both sides and an attachment top section 62 (see FIG. 1D). In both the fixed side sections 61, long holes for tilting 61*a* elongated in substantially the up-down direction or the longitudinal direction are formed. The fastener 7 is configured from the bolt shaft 71, a lock lever section 72, a fastening cam 73, and a nut 74. The fastener 7 is mounted by the nut 74 together with the lock lever section 72 and the fastening cam 73.

An assembly process of the steering device in the present invention is explained. The inner pipe 1, to which the stopper bracket 2 is welded and firmly attached, is mounted on the holding inner circumferential section 51*a* of the outer column 5 in a held state. The stopper bracket 2 is disposed in the slit section 51*b* of the outer column 5 (see FIG. 4B).

Thereafter, the outer column 5 holding the inner pipe 1 is disposed between both the fixed side sections 61 of the fixed bracket 6. Both the side plate sections 31 of the hanger bracket 3 are disposed between the width-direction outer surface side of both the clamp sections 52 of the outer column 5 and the inner surface side of the fixed side sections 61 of the fixed bracket 6.

Consequently, rotation of the inner pipe 1 can be prevented. Thereafter, the attachment sections 22 and 23 on the front side and the rear side of the stopper bracket 2 and the sections to be attached 32 and 33 of the hanger bracket 3 are provisionally joined to the screw sections 4 via the joining members 42 such as pins or screws. Thereafter, the bolt shaft 71 of the fastener 7 is inserted through the long holes for tilting 61*a* of both the fixed side sections 61, the long holes for telescopic adjustment 34 of the hanger bracket 3, and the fastening holes 52*a* of the clamp sections 52. The lock lever section 72, the fastening cam 73, and the nut 74 are mounted.

Thereafter, the lock lever section 72 is turned to be set in a lock state to fasten the joining members 42 inserted through the screw sections 4 and mount the hanger bracket 3 in an appropriate position. The hanger bracket 3 is joined by the joining members 42 such as pins or screws in this way. Consequently, even when distortion or deformation due to thermal effect occurs in the stopper bracket 2 or when dimension fluctuation of peripheral components occurs, it is possible to mount the hanger bracket 3 in an appropriate position. It is possible to maintain satisfactory tilting/telescopic operability.

In the present invention, according to necessity, friction plates for telescoping 82 are mounted on the outer surface sides of both the side plate sections 31 of the hanger bracket 3. Further, friction plates for tilting 81 are mounted between the outer surface sides of both the side plate sections 31 and the friction plates for telescoping 82. Shaft holes 81*a*, through which the bolt shaft 71 is inserted, are formed in the friction plates for tilting 81.

The friction plates for telescoping 82 align the positions of long holes for telescopic adjustment 82*a* formed in the friction plates for telescoping 82 and the long holes for telescopic adjustment 34 formed in both the side plate sections 31 of the hanger bracket 3 and fix front-back-direction both ends to both the side plate sections 31 with pins, screws, or the like.

The hanger bracket 3 is joined to the stopper bracket 2 by the joining members 42 such as pins or screws. Therefore, distortion and deformation due to thermal effect do not occur. Parallelism of both the side plate sections 31 is maintained. Therefore, it is possible to mount the friction plates for telescoping 82 and the friction plates for tilting 81 in appropriate positions. It is possible to maintain satisfactory tilting/telescopic operability.

The steering device in the present invention is configured as explained above. Therefore, it is possible to maintain parallelism of both the side plate sections 31 of the hanger bracket 3. Consequently, it is possible to satisfactorily perform tilting/telescopic operation. Assemblability is improved. In the hanger bracket 3, at least one of the front end plate 32*d* and the rear end plate 33*d* has a function of a stopper that regulates movement of the inner pipe 1 during the telescopic adjustment and has a function of preventing rotation of the inner pipe 1. This leads to a reduction in the number of components.

In a second aspect, a stopper section that regulates a movement amount in the front-back direction during the telescopic adjustment is formed in at least one side of the hanger bracket. Therefore, the hanger bracket also has a role of a stopper for regulating a movement amount of telescoping. This leads to a reduction in the number of components.

In a third aspect, friction plates for telescoping are fixed to outer side surfaces of the side plate sections, parallelism of which is maintained. Friction plates for tilting are disposed between the outer side surfaces of the side plate sections and the friction plates for telescoping. Therefore, it is possible to assemble the friction plates in appropriate positions. It is possible to smoothly perform tilting/telescopic operation.

What is claimed is:

1. A steering device comprising:
   an inner pipe;
   an outer column including a holding main body section in which the inner pipe is able to move in a front-back direction and to be fixed, and a clamp section that expands and reduces the holding main body section in a diameter direction;
   a fixed bracket including fixed side sections that sandwich width-direction both sides of the outer column;
   a stopper bracket including a movable guide section firmly attached to the inner pipe, and attachment sections formed at front-back-direction both ends of the movable guide section; and
   a hanger bracket in which sections to be attached to both the attachment sections are formed on front-back-direction both sides, the hanger bracket including side plate sections which sandwich width-direction both side surfaces of the clamp section and in which long holes for telescopic adjustment are formed, wherein
   the attachment sections of the stopper bracket and the sections to be attached of the hanger bracket are firmly attached and joined by joining members.

2. The steering device according to claim 1, wherein a stopper section that regulates a movement amount in the front-back direction during telescopic adjustment is formed in at least one side of the hanger bracket.

3. The steering device according to claim 2, wherein friction plates for telescoping are fixed to outer side surfaces of the side plate sections of the hanger bracket, and friction plates for tilting are disposed between the outer side surfaces and the friction plates for telescoping.

4. The steering device according to claim 1, wherein friction plates for telescoping are fixed to outer side surfaces of the side plate sections of the hanger bracket, and friction plates for tilting are disposed between the outer side surfaces and the friction plates for telescoping.

\* \* \* \* \*